Patented June 15, 1948

2,443,197

UNITED STATES PATENT OFFICE 2,443,197

METHOD OF CONFERRING ACCELERATING SETTING PROPERTIES ON A DIHYDROXY BENZENE-ALDEHYDE ADHESIVE BEFORE THE SETTING THEREOF AND UTILIZATION OF THE ADHESIVE IN THE BONDING OF MATERIALS

Philip Hamilton Rhodes, Portland, Maine, assignor, by mesne assignments, to Koppers Company, Inc., a corporation of Delaware No Drawing. Application October 5, 1942,
Serial No. 460,898

19 Claims. (Cl. 154—133)

The present invention relates to the production of cold-setting dihydroxy benzene aldehyde resin adhesives and their utilization as a bonding agent in the manufacture of articles, and particularly the manufacture of laminated articles including plywood, laminated wood, complex wooden structures, and the uniting together of any two objects including the bonding of cellulosic materials to metal, rubber, synthetic rubber, rubber substitute, leather, synthetic plastics or other plastic materials. Any one of the above may be bonded to any of the others.

The resin adhesives which are the subject matter of the present invention may also be utilized for the bonding together of two plastic materials.

It is well known to produce cold-setting resinous adhesives from monohydric benzene aldehyde condensation products, as for example, phenol formaldehyde cold-setting glues. These monohydroxy benzene aldehyde condensation products cold-set only in the presence of a relatively high concentration of an acid catalyst of a strong acid, as for example hydrochloric or sulphuric acid. When such cold-set glues are used to bond products of the character above set forth and especially cellulosic products, including wood panels or veneers, the acid in many cases exerts a strong deteriorating effect at the glue line upon the product being glued as for example, cellulosic products including wood, rubber, leather and the like, making the production of a strong joint substantially impossible.

It is well known in phenol aldehyde resin-forming reactions that when the state of condensation has advanced sufficiently the resin separates from the water in the reaction mass. On the other hand, during the resorcin aldehyde reactions, and especially resorcin formaldehyde reactions, as the state of condensation advances, there is a tendency for the resinous mass to absorb water forming colloidal masses, eventually advancing to hardened gels rather than splitting off the water.

In view of this decided tendency of the dihydroxy benzene aldehyde reaction products to retain water during the condensation step, it has been discovered that it is necessary in the production of cold-setting adhesives to control the water content during the reaction period and further, it has been discovered that the amount of water retained by the dihydroxy benzene aldehyde reaction products which are used for the production of cold-setting adhesives is greatly influenced by the temperature at which the reaction between the dihydroxy benzene and the aldehyde is effected.

It has been further discovered that the consistency of dihydroxy benzene aldehyde cold-setting glues may be varied over a rather wide range by controlling the water content or the amount of other liquid reaction medium, as for example alcohol, used during the carrying out of the condensation reaction, and that this consistency may be further greatly varied by controlling the temperature at which the reaction is effected.

It has been further discovered, in order to produce cold-setting dihydroxy benzene aldehyde resin adhesives, that not only must the water content be controlled and that preferably the temperature of reaction controlled, but that the time of the reaction must be maintained for such a period as to prevent setting up the glue during manufacture and for a reasonable period thereafter which may be defined as the shelf life of the glue, said period varying from about three hours to three months, as will be more particularly set forth hereinafter.

In the more specific aspect of the present invention, one-stage dihydroxy benzene aldehyde cold-setting glues may be produced which have a rather thin consistency or viscosity, varying from slightly below the consistency of water to slightly above the consistency of water, said cold-setting glues being produced with an alkaline catalyst.

It has also been discovered that these thin consistency dihydroxy benzene aldehyde resin adhesives may be treated with a protein material having adhesive properties to provide an adhesive which has advantageous properties. This protein may be in the form of casein, peanut meal, soya bean meal, zein, or blood albumen. Broadly, the protein material may comprise the usual vegetable and animal glues.

It has been observed that when the dihydroxy benzene aldehyde condensation product, produced as herein set forth, has added thereto a protein material, there is an exothermic reaction indicating a reaction between the dihydroxy benzene aldehyde reaction product and the protein material.

The present invention in one of its forms is directed to a method of accelerating the liquid reaction product of an aldehyde and a dihydroxy benzene, the molecular ratio of the former to the latter varying from 1:1 to 2:1, said method comprising applying to the spread adhesive prior to any substantial setting thereof a liquid alkaline hardening accelerating agent. The latter may be dispersed in a water-soluble alginate carrier gel. Desirably, the liquid alkaline hardening accelerating solution has a pH varying between about 9 and about 10.5. The dihydroxy benzene is preferably resorcin and the aldehyde is preferably formaldehyde.

In a variation of the invention, there is provided a method of bonding a plurality of members comprising spreading on the inner surface of one of the members an adhesive medium comprising the reaction product of an aldehyde and a dihydroxy benzene, the molecular ratio of the former to the latter varying from 1:1 to 2:1, coating the opposing surface of the other member with a liquid alkaline hardening accelerating solution, and prior to any substantial setting of the adhesive, contacting and bonding the so-coated surfaces and members one to the other. In preparing the adhesive, a liquid mixture is made of an aldehyde, as for example, formaldehyde, and a dihydroxy benzene, as for example, resorcin, together with a mutual solvent for these ingredients and the dihydroxy benzene-aldehyde reaction product, said solvent being typified by methanol and ethanol, and the like. The mutual solvent is preferably present in the mixture in the proportion of from 50% to 200% taken on the weight of the dihydroxy benzene. Preferably, bonding is effected at a temperature varying from 65° to 90° F. and within a time period of 24 hours. The alkaline accelerating agent is in the form of a gel which prevents or tends to prevent the alkaline solution from penetrating too quickly into the surfaces to which it is applied. This aids in maintaining the effectiveness of the alkaline accelerating solution.

The following is an example showing the production of a one-step resin adhesive from resorcin and formaldehyde in the presence of an alkaline catalyst. The following materials may be reacted in the amounts set forth:

*Example I*

|   | Grams |
|---|---|
| Resorcin | 110 |
| Formaldehyde (37%) | 90 |
| Water | 50 |
| Sodium hydroxide | 2 |

In the above example, the ratio of the formaldehyde to the resorcin is approximately 1.1 to 1. This ratio of formaldehyde to resorcin may vary from 1:1 to 1.5 to 1, or even higher. Basically all that is necessary is that the ratio of formaldehyde to resorcin be 1.1 to 1, or greater.

The constituents set forth in Example 1 are reacted in the following manner: 2 grams of sodium hydroxide are dissolved in about 50 grams of water. The amount of water used is that which will dissolve the sodium hydroxide, or equivalent material, and furnish a suitable amount of water to dissolve the latter with the dihydroxy benzene, as for example resorcin. After this solution has been made, about 110 grams of solid resorcin is added, the latter going into solution in the sodium hydroxide medium. This mixing of the above ingredients may be performed at ordinary temperatures. Heating is to be avoided. Thereafter about 90 grams of 37% formaldehyde is added, the latter being added a few grams at a time, with constant cooling and stirring of the reaction mass, to avoid overheating and local action. The term "local action" covers the spot reaction of resorcin and formaldehyde to form a curdy, insoluble mass.

After the formaldehyde, or other aldehyde, is added a reaction occurs and the mass, as stated, is stirred and cooled so as to maintain a homogeneous mixture at the initiation of the reaction and during the time the reaction is taking place. The reaction is thus carried out at about room temperature to allow complete addition of the formaldehyde before any major condensation takes place. While room temperature gives satisfactory results, it is recognized that this may be somewhat departed from and the reaction will proceed fairly smoothly without any major condensation taking place. In general, the reaction temperature may be maintained between 0° C. and 40° C., but is preferably maintained between 30° C. and 40° C. in order to avoid premature gelling.

After the formaldehyde is added, the reaction product is maintained within the temperature ranges above set forth but preferably between 30° and 40° C. for a period of time sufficient to allow the reaction to progress to the state where the resulting product is condensed sufficiently to allow the material to be used in a cold-setting adhesive process. In reacting the above materials in the quantity set forth and under the conditions stated, it has been ascertained that about one hour is sufficient for the above purpose.

The above-described reaction product comprises resorcin condensed with formaldehyde in aqueous solution. While in the example above set forth reaction is carried out in the presence of an aqueous solution, it is within the province of the present invention to produce a cold-setting glue of rather thin consistency of the character above set forth by carrying out the reaction in a medium consisting of a mutual solvent for the formaldehyde, the dihydroxy benzene and the finished dihydroxy benzene aldehyde reaction product, as for example the resorcin formaldehyde reaction product. Suitable solvents are methanol, ethanol, propanol, acetone, methyl ethyl ketone, aliphatic ketones and aromatic ketones and the like.

Under certain circumstances, the resulting cold-setting glue, which will set at temperatures as low as 40° to 50° F., may be directly utilized. However, when the glue is used for the bonding of elements which have a tendency to absorb the glue, it is highly desirable to increase the consistency or viscosity of the glue by adding thereto a suitable bodying agent, which may be inert but which preferably also imparts additional adhesive properties to the glue. As examples of an inert body agent, mention may be made of wood flour, walnut shell flour, barium sulphate and other fillers usually used in cold-setting glues. The following are examples of active bodying agents which add to the adhesive properties of the cold-setting glue: casein, peanut meal, soya bean, zein, blood albumen. In general, the vegetable and animal glues may be mixed with the resorcin aldehyde glues. It is desired to point out that any auxiliary glue which is compatible with the dihydroxy benzene aldehyde adhesive and which will not deleteriously affect the properties of said adhesive, may be mixed therewith provided said auxiliary glue functions to keep the dihydroxy benzene aldehyde adhesive on the glue line and further preferably, prevents the thin dihydroxy benzene aldehyde glue from penetrating into the interstices of the article being glued and especially from wastefully penetrating into the interstices of wood. The presence of barium sulphate in the bond enables the latter to be X-rayed to assist in ascertaining its physical properties.

In producing the above set forth adhesive by mixing a dihydroxy benzene aldehyde resin, and preferably resorcin formaldehyde resin, with a protein constituent, the mixture may be made by adding 100 grams of a thin liquid resorcin formaldehyde adhesive to about 20 to 40 grams of the powdered protein, as for example casein. The mixture is thoroughly blended to provide an adhesive which has sufficient body to remain on the glue line while it hardens.

In the above example, the liquid resorcin formaldehyde resin contains about 50% of resin solids. The solution of the resin is thin because the mixture of resorcin and formaldehyde has not advanced to that stage where these constituents have combined to form large molecular groups. If for any reason it is desirable to produce a thinner solution of the resorcin formaldehyde resin, a larger amount of water may be added initially so that said water is present during the cooking operation. On the other hand, if the consistency of the resorcin formaldehyde adhesive is to be increased, less water should be added during the cooking operation. Of course in the cooking operation, instead of using water any mutual solvent in which the resorcin and formaldehyde will dissolve and then unite, may be used.

Instead of introducing the water or other mutual solution medium during the cooking operation, the resorcin formaldehyde resin adhesive may be diluted with water after the above-described condensation has been effected but provided it is added immediately upon termination of the cooking period, otherwise precipitation of the resin solids is apt to occur. However if any substantial time is allowed to elapse after the cooking operation is finished, precipitation and consequent setting up of the resin solids takes place upon dilution with water. However the above-prepared resin may be diluted immediately after cooking, or a substantial period thereafter, with non-aqueous solvents of the character above set forth, which are merely typical of a great number of solvents which may be used. In other words, any solvent may be used in which the cooked product or the reaction product is soluble and which will not deleteriously affect the material to which the resulting adhesive is applied and particularly will not deleteriously affect cellulosic materials, including wood, laminated wood and plywood.

In applying the glue or resin adhesive to the work piece, it is satisfactory to brush the glue on one of the two surfaces to be united, then join the surfaces and thereafter hold them together by any suitable means, as for example clamps, in order that the adhesive may harden and form a suitable bond.

The resin adhesive will harden or set at room temperature, that is around 70° F. in some four to six hours. It is to be understood that the glue will be sufficiently set or hardened in this period of time for the work piece to be handled, that is to be sawed, sanded, shaped or otherwise prepared for use. During this period of initial set, the bond develops the major portion of its strength. The cold-set glue of the present invention is capable of setting or hardening at a temperature varying between 40° F. and 200° F. As the temperature of cure decreases from about 70° F. to 40° F., the time of cure increases to about 12 to 16 hours. As the temperature of cure increases above 70° F., the time will decrease and the hardening time can be appreciably shortened by allowing the resin adhesive to set in a specially heated drying room. Instead of using a powdered protein filler, extender, or bodying agent, a liquid filler, bodying or extending agent may be substituted therefor.

The cold-set dihydroxy benzene aldehyde resin of the present invention may also be prepared from the following mixture:

*Example II*

|  | Grams |
| --- | --- |
| Resorcin | 110 |
| Formaldehyde (37%) | 90 |
| Glycerine | 30 |

In preparing a resin adhesive from the above mixture, the resorcin and glycerine are well mixed and thereafter the formaldehyde is added. The mixture is gradually heated to a temperature, and for a time, to cause reaction to occur between the mixed constituents and confer upon the condensation product a viscosity approximating honey. More specifically, the mix may be heated from about 20° C. to about 60° C. in about 15 or 20 minutes to about 30 minutes. Thereafter the temperature is maintained at about 60 or 65° C. for a period of about 30 minutes to confer on the reaction product a viscosity approximating honey. It is desired to point out that the object of heating the mixture, is to cause the reaction to be initiated and thereafter to bring the reaction product to the desired viscosity and this may be accomplished by coordinating the temperature of heating and the time of heating. As the temperature is increased from about 60° to about 65° C., the time of heating may be decreased. In general the total time of heating may vary from about 45 minutes to 2 hours, as the temperature varies between 65° C. and 20° C. Obviously, as the size of the starting batch of resorcin, formaldehyde and glycerine increases, the time of the reaction to attain the objectives above set forth will be materially increased. After the mixture has attained the desired viscosity, which is that viscosity which allows the adhesive to be readily spread on the work pieces, the reaction product is rapidly cooled so that the viscosity of the reaction product is stabilized. When the so-produced adhesive is spread upon the articles to be glued, it functions as an adhesive because the material develops its bonding properties by continuing to react; that is to harden or set to an infusible, insoluble resin or resinoid.

It is desired to point out that the amount of water present in the reaction mix set forth in Example II is much less than set forth in the mix of Example I. The reduction in the amount of water functions to assist in providing a resin adhesive, which condensed or partially condensed resin adhesive has a greater consistency or is more viscous than the resin adhesive produced in accordance with Example I. There is also present in Example II an agent which functions to inhibit any premature setting up of the resin adhesive. The temperature control also is utilized in conjunction with said inhibiting agent to prevent the resin adhesive from prematurely setting up or being gelled. Therefore in a sense, the temperature limit of about 60° is critical considering the properties it is desirable to impart to the resin adhesive. While it is best not to allow the temperature, during the reaction, to rise much above 60° C., in general it should not exceed 65° C. This temperature limit can best be stated in a functional manner. The temperature limit should not be raised above a point beyond which the reaction will get out of control, leading to a premature setting. Premature setting results in a gel; in other words, it is desired to keep the resin adhesive in viscous condition in the A stage, which is fusible and soluble in solvents.

It is further desired to point out that the glycerine tends to absorb water and keep the viscosity of the resulting resin adhesive within the desired range.

It is difficult to state the viscosity of the resulting resin adhesive produced by utilizing a mixture of the character set forth in Example II. However the viscosity is distinctly greater than water and more nearly approaches that of glycerine and by varying the amount of water and glycerine present in the mixture and controlling the temperature, the viscosity of the resulting mixture may be maintained so that a viscosity ranging from substantially greater than water to substantially greater than glycerine is obtained. The upper limit of the viscosity range is that it must not be greater than will allow the resin adhesive to be brushed evenly on the surface to be glued; that is, when the resin adhesive is brushed on to the work piece it must not appear as waves of adhesive.

The dihydroxy benzene aldehyde glue produced in accordance with Example II will set at room temperature to a hardened state in a period varying between 14 to 24 hours or 16 to 24 hours.

When a glue of the character set forth in Example II is applied to a work piece the speed or time of hardening may be accelerated by applying to the spread resin adhesive a hardening accelerator just before the work piece is laid up and clamped. It is desired to point out that in order to obtain a satisfactory bond, the resin adhesive produced from a mixture of the type set forth in Example II should be spread on the surface of the work piece and then the accelerating agent should be applied to said resin adhesive surface prior to any substantial hardening or setting occurring in the resin adhesive. In this way the accelerating agent will speed up the hardening. However if the adhesive resin glue is spread on the work piece and it is allowed to dry excessively or prematurely set up, the hardening agent will not function to accelerate or speed up the time of cure or hardening. Preferably, the hardening agent is an alkaline medium such as sodium hydroxide, ammonium hydroxide, sodium salts, ammonium salts, potassium salts, organic bases such as triethanol amine and the like. Most desirably, the pH of the alkaline solutions is maintained between 9.0 and 10.5.

Instead of using an alkaline hardening accelerator, an acid hardening accelerator may be used such as hydrochloric, oxalic, sulphuric, citric acid, boric acid, salicylic acid, and the like.

It is desired to spread the glues produced in accordance with Examples I and II in an amount varying between 15 to 50 lbs. per 1,000 square feet of single glue line.

The resin adhesive set forth in Example II may be mixed with other cold-setting glues and especiatlly the protein glues.

The present invention may also be carried out utilizing the resin adhesive produced by mixing the following together:

Example III

| | Grams |
|---|---|
| Resorcin | 330 |
| Paraform $(CH_2O)_x$ | 102 |
| Water | 150 |

In the above reaction mixture, it is to be noted that the amount of water present per unit of resorcin is substantially less than the amount of water present in Example I. It is also to be noted that the active $CH_2$ radical is present as paraform, which is a solid known as $(CH_2O)_x$. This material is better known as polyoxymethylene. It is observed that as this reaction progresses, due to gradual heating of the mixture, that initially a substantial portion of the paraform remains undissolved because of its limited solubility in water, it being soluble approximately 21 grams per 100 grams of water at 25° C. As the temperature is gradually raised, a reaction is initiated between the dissolved paraform and the resorcin, altering the equilibrium between the dissolved and undissolved solid paraform. This reaction gradually utilizes the paraform in solution, causing the balance of the paraform to dissolve. When the temperature has reached about 70° C., the availability of active formaldehyde ions is such that the reaction becomes self-sustaining. The temperature then rises quite rapidly to about 90° to 95° C., accompanied by a clearing of the solution indicating that the final undissolved paraform has been dissolved, and used up in the reaction. The reaction is then abruptly stopped by rapid cooling to a temperature varying between 70° and 80° C. to reduce the speed of the reaction and stabilize the viscosity of the reaction product. This resin adhesive has now reached a state where it may be characterized as substantially stable, and it can be allowed to cool to room temperature, that is about 20° C., and because of the stability of the product there will be no tendency for premature hardening, gelling or setting up.

The condensation product produced as above set forth has a viscosity such that it cannot be poured from an open vessel at room temperature at 20° C., however the condensation product will cold flow. The viscosity is of the order of that of Crisco at room temperature. However the viscosity of the reaction product may be decreased by increasing the amount of water present in the original reaction mixture to a point where the amount of dissolved paraform does not provide an excessive amount of active formaldehyde ions, which function to cause premature setting-up and confer on the adhesive a viscosity which prevents the adhesive from being readily used as a bonding agent. Premature setting-up causes the resulting product to lose its value as an adhesive since it has assumed a more non-plastic state. Stated differently, the adhesive value of the adhesive is developed through setting. If any substantial amount of setting occurs during manufacture, the value of the product as an adhesive decreases. In general, the water content present in the original mixture containing resorcin, paraform and water may vary from about 10% to 75 or 80%, taken on the weight of the resorcin present in the mixture. As the ratio of water to resorcin decreases, the viscosity of the resulting adhesive will vary from that of a cold flowable plastic solid to that of approximately honey. Preferably the viscosity should approximate a soft, solid condition which will allow the adhesives to be packaged as a solid and shipped in that condition to the ultimate consumer. In order to efficiently utilize the adhesive as a bonding agent in the production of bonded articles including plywood, laminated wood and veneered articles, it is necessary to dilute the product so that it has a viscosity which enables it to be readily spread on the glue line.

A resin adhesive product as above set forth is, as stated, characterized by high stability and cures or hardens relatively slowly at normal gluing temperatures, which are temperatures varying between 65° F. to 90° F. It is therefore highly desirable to accelerate the hardening of the glue and this may be accomplished by spreading the resin adhesive on the work piece and prior to the drying of the glue, that is to the evaporation of the moisture content of the glue, treating the surface of the glue with an accelerating hardening agent in accordance with the manner described in connection with the resin adhesive set forth in Example II.

The resin adhesive produced from the mixture set forth in Examples II and III may be utilized in uniting or bonding a plurality of elements one to the other in the manner hereinafter set forth. Illustratively, a plywood panel which is composed of a face ply, a core ply and a back ply may have both surfaces of the core treated with a resin adhesive produced in accordance with Examples II or III and thereafter the hardening of the spread adhesive may be accelerated by applying to the inner surface of the face and the inner surface of the back an accelerating medium comprising an accelerating agent dispersed in a carrier, said carrier functioning to prevent the accelerating agent from striking in or penetrating into the inner surface of the plies. The accelerating agent is preferably an alkaline medium such as sodium hydroxide, potassium hydroxide, ammonium hydroxide, lithium hydroxide, ammonium salts, alkali salts, tribasic sodium phosphate and similar agents, it being obvious that the hardening agent is not limited to the specific compound set forth.

The alkaline medium should preferably have a pH varying between 9.0 and 10.5 so as to prevent said alkaline medium from exerting a deleterious influence upon the inner surfaces of the plies being bonded.

It is preferred to use a carrier for the alkaline medium which is characterized by high viscosity for small concentration of solid in solution and secondly, must be compatible with the pH of the setting and hardening agent employed so as to not break down the gel structure of the carrier medium. When this occurs there is formed a limpid liquid readily penetrating into the wood, whereby the function of the carrier is nullified.

As an illustrative example of a carrier compatible with the alkaline hardening agent, sodium, potassium or ammonium alginate is set forth. Inorganic and organic hardening agents may be used which will stay dispersed in the carrier. The hardening agents are usually liquid and this liquid in appropriate concentration is dispersed in the carrier to give the composite hardening accelerator, composed of the carrier and the hardening liquid distributed therethrough, a pH which will speed up the hardening action of the adhesive. The permissible variation in pH is herein set forth. While the hardening agent is usually an aqueous solution, it is within the province of the present invention to dissolve a hardening agent in a non-aqueous solvent and distribute the resulting hardening agent in a compatible carrier and control the pH of the composite hardening accelerator medium so as to speed up the hardening action of the adhesive after it has been applied to the material to be bonded.

Instead of using an alkaline hardening agent, acid hardening agents may be used, as for example: hydrochloric, sulphuric, phosphoric, citric acid, oxalic acid, boric acid and salicylic acid. The pH of the acid hardening accelerator should vary preferably between 3.0 and 5.0. When using the acid hardening accelerator, the carrier medium may comprise a gel compatible with the acid used, as for example animal gelatin and the like.

In carrying out the present invention, for the dihydroxy benzenes there may be substituted a monohydric benzene or phenol such as phenol per se, cresylic acid, xylenol and the like, in an amount which will not destroy the water solubility of the resulting resin adhesive. Usually the maximum amount of monohydric phenol which may be substituted without destroying the water solubility is in the neighborhood of 25% of the total phenolic body present in the original mix, taken on a molar basis.

The present invention resides not only in the method of preparing the cold-set resin adhesives herein set forth but also in the product itself. It is desired to point out that the dihydroxy benzene aldehyde resin adhesives and particularly the resorcin formaldehyde resin adhesives are characterized by the following properties:

1. The dihydroxy benzene aldehyde resin adhesives cold set at a temperature varying between 40° F. and 200° F., and preferably between 40° F. and 90° F. The most satisfactory cold setting temperature varies from about 65° F. to about 90° F.

2. The dihydroxy benzene aldehyde cold set resin adhesive produces a stronger bonding film per square inch of bonding surface than the phenolic aldehyde cold set resin adhesives because the dihydroxy benzene resin adhesives are structurally more polar than the corresponding monohydric benezene aldehyde condensation cold-setting resin adhesives.

3. Cold-set dihydroxy benezene aldehyde resin adhesives herein described set in an alkaline state, the pH of said adhesives preferably varying between 7.0 and 10.6 and more desirably from about 7.0 to about 9.0. In this connection, when this class of cold-set resin adhesives is used for the bonding of cellulosic materials, including wood, wood plies and the like, the alkaline condition of the resin inhibits damage to the work article and particularly those made of wood, this contrasting quite notably with what occurs when the cold-set adhesive is strongly acid.

4. The cold-set adhesives of the present invention also set in an acid state, preferably having a pH varying between about 3.0 to about 7.0, and most desirably varying between about 4.0 and 7.0, but are characterized by the property of requiring a much lower degree of acidity than the prior art phenolic aldehyde cold-setting adhesives. One of the notable defects of the prior art cold-setting phenol aldehyde resin adhesives is due to the property of said adhesives whereby they require a high degree of acidity to cold set. The phenolic aldehyde cold-set adhesives set at a pH of 2.0 or less and usually between 0.0 and 1.0. The fact that the cold-set phenolic aldehyde resin glues are so acid adversely affects the strength of the glue line of the wood or other cellulosic medium to which the adhesive is applied. Although the phenolic aldehyde bond itself is characterized by high strength, the strength of the complete bond at the glue line is exceedingly low because of the necessity of using an acid in the cold-setting of the adhesive.

5. The dihydroxy benzene aldehyde and particularly the resorcin formaldehyde cold-set resin adhesives differ from the cold-set urea aldehyde or melamine aldehyde cold-set resin adhesives in their resistance to the destructive action of boiling water. When a fourteen-hour old, three-ply fir panel is bonded with a dihydroxy benzene aldehyde and particularly a resorcin formaldehyde cold-set resin adhesive at 70° F., said cold-set adhesive being produced by any of the methods herein set forth, is submerged in boiling water for six hours and removed, the drop in bond strength is substantially less than that which normally occurs and the bond does not fail. More specifically, if a similarly constructed panel which has been set for fourteen hours, after being bonded with a urea formaldehyde cold-set resin adhesive, is subjected to the same test, the bond fails within one hour. If the urea formaldehyde bond is allowed to set for six days, then it fails when tested in boiling water in a period varying between one to two hours. The dihydroxy benzene aldehyde bond, and particularly the resorcin aldehyde bond, does not fail in this time period. Since the bond fails to dissolve or disintegrate, it is waterproof, and this is a notable advantage over other synthetic glues.

While the present invention has been set forth in connection with utilization of resorcin as the dihydroxy benezene, it is within the province of the present invention to use catechol, hydroquinone and substitution products or derivatives thereof.

While paraform and formaldehyde have been set forth as a representative of suitable aldehydes to be used in carrying out the present invention, it is desired to state that any polymer or homolog of formaldehyde may be used.

Instead of using formaldehyde, other aldehydes may be used such as acetaldehyde, paraldehyde, propionaldehyde, the butyl aldehydes, the furfural aldehydes, and the like. Instead of using a single aldehyde, it is within the province of the present invention to react the dihydroxy benzene with a mixture of aldehydes such as a mixture of formaldehyde and butyl aldehyde. Dialdehydes may be used in place of the monoaldehydes. As a representative of the dialdehydes, glyoxal is set forth.

The dihydroxy benezene aldehyde resin adhesives herein disclosed and their equivalents, produced in accordance with the general disclosures of the present application, may be used in the production of aeroplane structures, boats, furniture, light structural sections such as beams and arches. The invention is of particular value in the production of laminated wood, plywood or wherever it is desirable to bond plies of cellulosic material to each other or to provide a laminated or panel structure which may comprise a layer of wood together with a layer of cotton fibers, cloth or asbestos. The plies which are bonded with the adhesives of the present invention may be inorganic in character, as, for example, asbestos.

Referring to Example I, 100% of water taken on the weight of the resorcin is used. This water content may be decreased to 50% or raised to 200%, taken on the weight of the resorcin. However, most satisfactory results are obtained when the water content is around 100%, as this gives the desired operating conditions during cooking and also the desired viscosity in the final product. In general, the amount of water used in Example I may vary between 50% to 200%, taken on the weight of the dihydroxy benzene used.

In Example II, the liquid content, including the water content, is about 50%, considering that the methanol content present in the aldehyde may be normally replaced by water. In general, the water content in the mix set forth in Example II may vary between 50 and 100%, taken on the weight of the dihydroxy benzene. However considering the several functions which are performed by the glycerine, it is distinctly desirable that the water content be about 50%.

Referring to Example III, the aldehyde is anhydrous or substantially so, and the water content of the mixture is preferably about 50%, taken on the weight of the dihydroxy benzene used. The water content may be considerably reduced and advantage may still be taken of the action of the paraform hereinbefore set forth. In general, the water content of the mix in Example III may be as low as 25% and may be increased to 70% or 80%.

The water content of the dihydroxy benzene adhesives herein described may in general vary between 25% to 200%, taken on the weight of the dihydroxy benzene but preferably should be between 40% to 100%. In conjunction therewith the temperature may vary from 5° C. to 95° C. The mix set forth in Example I may be reacted under temperatures varying between 5° C. and 40° C. that set forth in Example II between 20° C. and 65° C., and that set forth in Example III between 20° C. and 95° C.

In general, the adhesives herein set forth are produced by maintaining the time of coooking and preparation between about ½ an hour and 2 hours, or between 45 minutes and 2 or 2½ hours. When the lower temperatures are employed, the time of cooking and preparation will vary between 1 and 2 hours, and generally should not exceed 2 to 4 hours. When the higher temperatures are employed, the time of cooking and preparation will vary between ½ hour to 2 hours, or in some cases, the time will vary between ½ an hour and 2 to 3 hours.

It has been discovered that resin adhesive and bonding medium may be produced by reacting a dihydroxy benzene, as, for example, resorcin, with an aldehyde while controlling the molecular ratio of the aldehyde to the dihydroxy benzene so that it is greater than 1:1 and preferably varies from 1:1 to 2:1, said reaction being carried out in the presence of a mutual solvent for said reacting constituents for a period inhibiting any substantial gelation of the reaction product while conferring adhesive and bonding properties upon the reaction product, the amount of mutual solvent used in carrying out the reaction being that which will preferably produce an adhesive composition and bonding medium varying in consistency or viscosity between about that of water to about that of a cold flowable plastic solid of the order of Crisco. In general, the reaction may be carried out at temperatures varying between about 5° C. and about 100° C., but preferably not exceeding 95° C. as herein set forth, and the period of reaction may vary between 30 minutes and 2 hours, and in some cases 30 minutes to 3 or 4 hours, and in extreme cases, the time of the reaction may be as much as 10 hours or 10 to 14 hours, but this is unusual.

It is desired to point out that the viscosity is controlled by controlling the amount of mutual solvent present during the cooking operation, or, stated differently, the viscosity of consistency of the potential resin may be varied by varying the amount of solvent present during the cooking operation, the greater the amount of solvent present during the cooking operation, the less the viscosity of the resulting adhesive composition.

Referring to Example II, the glycerine therein may be substituted by any agent which will function to absorb water during the reaction and inhibit any tendency of the reaction product to gel during cooking. More specifically, the glycerine may be replaced by glycols such as diethylene glycol and other polyhydric alcohols of which an example is sorbitol.

While the alkali alginates have been set forth as a suitable carrier medium, any of the algin compounds may be used which are compatible with an alkali, and, further, the invention is not limited to the use of this particular type of alkaline carrier. Any carrier which is alkaline may be used when the hardening agent is alkaline in character.

The term "alkali alginate gel" is to be interpreted as covering sodium, potassium and ammonium alginates. These are all water-soluble alginates.

Having thus described the invention, what is claimed as new and desired to be secured by Letters Patent is:

1. The method of accelerating the setting of a spread liquid adhesive comprising the reaction product of an aldehyde and a dihydroxy benzene, the molecular ratio of the former to the latter varying from 1:1 to 2:1, comprising applying to the spread adhesive prior to any substantial setting thereof a liquid alkaline hardening accelerating solution.

2. The method of accelerating the setting of a spread liquid adhesive comprising the reaction product of an aldehyde and a dihydroxy benzene, the molecular ratio of the former to the latter varying from 1:1 to 2:1 comprising applying to the spread adhesive prior to any substantial setting thereof a liquid alkaline hardening accelerating solution dispersed in a water-soluble alginate carrier gel.

3. The method of accelerating the setting of a spread adhesive comprising the reaction product of an aldehyde and a dihydroxy benzene, the molecular ratio of the former to the latter varying from 1:1 to 2:1, comprising applying to the spread adhesive prior to any substantial setting thereof a liquid alkaline hardening accelerating solution having a pH varying between about 9 and about 10.5.

4. The method of accelerating the setting of a spread adhesive comprising the reaction product of an aldehyde and a dihydroxy benzene, the molecular ratio of the former to the latter varying from 1:1 to 2:1 comprising applying to the spread adhesive prior to any substantial setting thereof a liquid alkaline hardening accelerating solution having a pH varying between about 9 and about 10.5, said alkaline solution being dispersed in an alkali alginate carrier gel.

5. The method of claim 1 in which the dihydroxy benzene is resorcin.

6. The method of claim 1 in which the dihydroxy benzene is resorcin and the aldehyde is formaldehyde.

7. The method of claim 3 in which the dihydroxy benzene is resorcin and the aldehyde is formaldehyde.

8. The method of bonding two plywood members one to the other comprising spreading on the inner surface of one of the members an adhesive medium comprising the reaction product of an aldehyde and a dihydroxy benzene, the molecular ratio of the former to the latter varying from 1:1 to 2:1, coating the opposing surface of the other plywood member with a liquid alkaline hardening accelerating solution dispersed in a water-soluble alginate carrier gel, and prior to any substantial setting of said adhesive contacting and bonding the so-coated surfaces and members one with the other.

9. The method of bonding two members one to the other comprising spreading on the inner surface of one of the members an adhesive medium comprising the reaction product of an aldehyde and a dihydroxy benzene, the molecular ratio of the former to the latter varying from 1:1 to 2:1, coating the opposing surface of the other member with a liquid alkaline hardening accelerating solution dispersed in an alkali alginate carrier gel, and prior to any substantial setting of said adhesive contacting and bonding the so-coated surfaces and members one with the other.

10. The method of making a plywood panel comprising a face ply, a core ply, and a back ply comprising spreading on both surfaces of the core an adhesive medium comprising the reaction product of an aldehyde and a dihydroxy benzene, the molecular ratio of the former to the latter varying from 1:1 to 2:1, coating the inside surface of the face ply and the inside surface of the back ply with a liquid alkaline hardening accelerating solution dispersed in an alkali alginate gel, and prior to any substantial setting of said adhesive contacting and bonding the so-treated surfaces of the panel members one with the other.

11. The method of bonding two members one to the other comprising spreading on the inner surface of one of the members an adhesive medium comprising the reaction product of an aldehyde, a dihydroxy benzene, and a mutual solvent therefor, the molecular ratio of the aldehyde to the dihydroxy benzene varying from 1:1 to 2:1 and the solvent being present in the mixture in a proportion varying from about 50% to 200% taken on the weight of the dihydroxy benzene, coating the opposing surface of the other member with a liquid alkaline hardening accelerating solution dispersed in an alkali alginate carrier gel, said alkaline solution having a pH varying between about 9 and about 10.5 and prior to any substantial setting of said adhesive contacting and bonding the so-coated surfaces and members one with the other at a temperature varying between about 65° F. and about 90° F. within a time period of 24 hours.

12. The method of bonding a plurality of members one to the other comprising spreading on one of said members a slow cold-setting adhesive and bonding medium free of any premature set-up particles, said adhesive comprising the reaction product of an aldehyde and a dihydroxy benzene, the molecular ratio of the former to the latter varying from 1:1 to 2:1, coating the spread adhesive prior to any substantial setting up thereof with a liquid alkaline hardening accelerating agent which converts the slow-setting adhesive and bonding medium into one capable of being set within a period of 24 hours, and cold-setting the adhesive and bonding medium at a temperature varying between about 65° F. and about 90° F. within a period of time of less than 24 hours.

13. The method of bonding a plurality of wooden members one to the other comprising spreading on one of said wooden members a slow cold-setting adhesive and bonding medium free of any premature set-up particles, said adhesive comprising the reaction product of an aldehyde and a dihydroxy benzene, the molecular ratio of the former to the latter varying from 1:1 to 2:1, coating the spread adhesive prior to any substantial setting up thereof with a liquid alkaline hardening accelerating agent which converts the slow-setting adhesive and bonding medium into one capable of being set within a period of 24 hours, and cold-setting the adhesive and bonding medium at a temperature varying between about 65° F. and about 90° F. within a period of time of less than 24 hours.

14. The method of claim 8 in which the dihydroxy benzene is resorcin.

15. The method of claim 10 in which the dihydroxy benzene is resorcin.

16. The method of claim 10 in which the dihydroxy benzene is resorcin and the aldehyde is formaldehyde.

17. The method of claim 11 in which the dihydroxy benzene is resorcin and the aldehyde is formaldehyde.

18. The method of claim 12 in which the dihydroxy benzene is resorcin and the aldehyde is formaldehyde.

19. The method of bonding a plurality of wooden members one to the other comprising spreading on the inner surface of one of said members a slow setting adhesive medium comprising the reaction product of an aldehyde and a dihydroxy benzene, the molecular ratio of the former to the latter varying from 1:1 to 2:1, coating the opposing surface of the other wooden member prior to any substantial setting up thereof with a liquid alkaline hardening accelerating solution in the form of a gel whereby the alkaline solution is prevented from penetrating into the wooden surface to which it is applied and its effectiveness maintained, and prior to any substantial setting of said adhesive, contacting and bonding the so-coated surfaces and members one with the other.

PHILIP HAMILTON RHODES.

REFERENCES CITED

The following references are of record in the file of this patent:

UNITED STATES PATENTS

| Number | Name | Date |
|---|---|---|
| 1,065,495 | Aylsworth | June 24, 1913 |
| 1,147,264 | Peter | July 20, 1915 |
| 1,776,366 | Novotny | Sept. 23, 1930 |
| 1,849,109 | Novotny | Mar. 15, 1934 |
| 1,960,177 | Weber et al. | May 22, 1934 |
| 2,019,834 | Vierling et al. | Nov. 5, 1935 |
| 2,128,635 | Charch et al. | Aug. 30, 1938 |
| 2,150,697 | Nevin | Mar. 14, 1939 |
| 2,150,698 | Nevin | Mar. 14, 1939 |
| 2,188,736 | Jordan | Jan. 30, 1940 |
| 2,233,875 | Schmidt et al. | Mar. 4, 1941 |

FOREIGN PATENTS

| Number | Country | Date |
|---|---|---|
| 325,861 | Great Britain | Mar. 3, 1930 |
| 342,278 | Great Britain | Jan. 20, 1931 |
| 435,041 | Great Britain | Sept. 12, 1935 |
| 524,425 | Germany | May 7, 1931 |

OTHER REFERENCES

Farmer's Bulletin 653, U. S. Dept. of Agriculture, Apr. 7, 1915.